United States Patent
Zhai et al.

(10) Patent No.: US 11,074,435 B2
(45) Date of Patent: Jul. 27, 2021

(54) METHOD AND APPARATUS FOR PREDICTING FACE BEAUTY GRADE, AND STORAGE MEDIUM

(71) Applicant: WUYI UNIVERSITY, Jiangmen (CN)

(72) Inventors: Yikui Zhai, Jiangmen (CN); Cuilin Yu, Jiangmen (CN); Wenbo Deng, Jiangmen (CN); Qirui Ke, Jiangmen (CN); Junying Gan, Jiangmen (CN); Junying Zeng, Jiangmen (CN); Wenlue Zhou, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 65 days.

(21) Appl. No.: 16/530,820

(22) Filed: Aug. 2, 2019

(65) Prior Publication Data
US 2021/0004570 A1    Jan. 7, 2021

(30) Foreign Application Priority Data

Jul. 5, 2019 (CN) .......................... 201910602383.2

(51) Int. Cl.
| | |
|---|---|
| *G06K 9/00* | (2006.01) |
| *G06K 9/42* | (2006.01) |
| *G06K 9/62* | (2006.01) |
| *G06T 7/00* | (2017.01) |

(52) U.S. Cl.
CPC ..... *G06K 9/00288* (2013.01); *G06K 9/00268* (2013.01); *G06K 9/42* (2013.01); *G06K 9/6217* (2013.01); *G06T 7/0002* (2013.01); *G06T 2207/20081* (2013.01); *G06T 2207/20084* (2013.01); *G06T 2207/30201* (2013.01)

(58) Field of Classification Search
CPC ... G06K 9/00268; G06K 9/00671; G06K 9/66
See application file for complete search history.

(56) References Cited

U.S. PATENT DOCUMENTS

2017/0076474 A1* 3/2017 Fu ...................... G06K 9/00268

FOREIGN PATENT DOCUMENTS

CN        104850825 A  *  8/2015

OTHER PUBLICATIONS

Zhou L, Li Q, Huo G, Zhou Y. Image Classification Using Biomimetic Pattern Recognition with Convolutional Neural Networks Features. Comput Intell Neurosci. (Year: 2017).*

* cited by examiner

*Primary Examiner* — Ross Varndell
(74) *Attorney, Agent, or Firm* — Arc IP Law, PC; Joseph J. Mayo

(57) ABSTRACT

A method for predicting a face beauty grade includes the following steps of: acquiring a beautiful face image of a face beauty database, preprocessing the beautiful face image, and extracting a beauty feature vector of the beautiful face image, the preprocessing unifying data of the beautiful face image; recognizing continuous features of samples of the same type in a feature space by using a bionic pattern recognition model, and classifying the beauty feature vector to obtain a face beauty grade prediction model; and collecting a face image to be recognized, and inputting the face image to be recognized into the face beauty grade prediction model to predict a face beauty grade and obtain the beauty grade of the face image to be recognized.

9 Claims, 4 Drawing Sheets

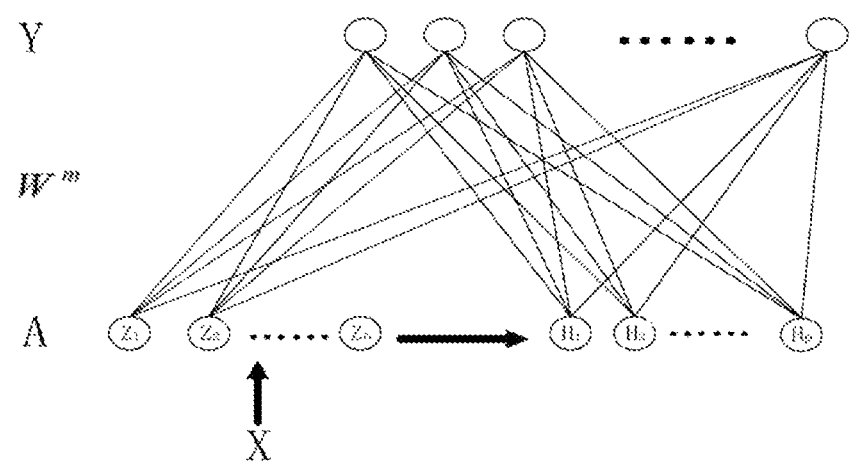
FIG. 4
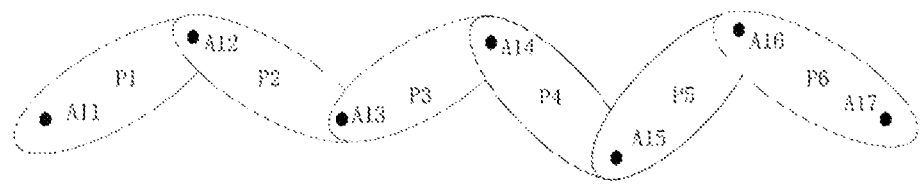
FIG. 5
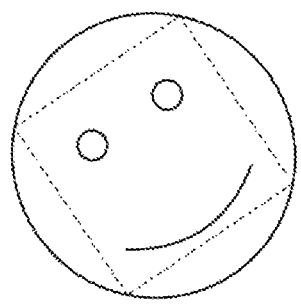 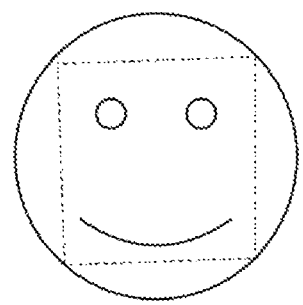 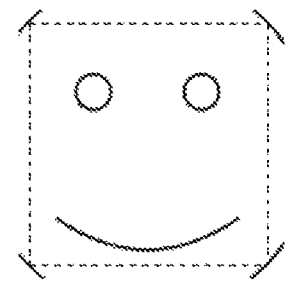
FIG. 6a    FIG. 6b    FIG.6c

METHOD AND APPARATUS FOR PREDICTING FACE BEAUTY GRADE, AND STORAGE MEDIUM

CROSS REFERENCE TO RELATED APPLICATION

This application claims the benefit of CN patent application No. 201910602383.2 filed on Jul. 5, 2019, the entire disclosures of which are hereby incorporated herein by reference.

BACKGROUND OF THE INVENTION

Field of the Invention

The present disclosure relates to the field of image processing technology, and more particularly, to a method and an apparatus for predicting a face beauty grade, and a storage medium.

Description of the Related Art

As a natural attribute of human being, a face has strong stability and individual difference. The most basic judgment that whether a person is beautiful or not is based on an initial impression for the face, because everyone has a love of beauty. However, it appears an abstract problem of how to evaluate a beauty grade of a face image. Evaluation of the beauty grade of the face is likely to be influenced by subjective factors, even different people and races have different evaluation standards. According to the traditional technology, the beauty of the face is predicted through geometric or appearance features. It requires manual labeling of training samples during a training phase for the extraction of the geometric features requires accurate feature point calibration and the acquisition of large-scale geometric feature data, and the detection of face feature points. However, the involvement of too many subjective factors easily leads to the non-universality of the obtained results, and the labeling workload is large due to a large number of images to be labeled. In addition, a local or whole face texture structure needs to be extracted for appearance features, but the appearance features are greatly affected by sample background noise, pose changes, etc., and the high-level and more abstract face texture structure is not deeply exploited, resulting in a poor prediction of face beauty.

BRIEF SUMMARY OF THE INVENTION

In order to solve the problems above, the present disclosure is intended to provide a method for predicting a face beauty grade, which can detect a face beauty image in an image file and realize the prediction of a face beauty grade. The method is more simple in network structure, less influenced by external factors and higher accurate in detection.

A technical solution employed by the present disclosure to solve the technical problems thereof is as follows: according to a first aspect, an embodiment of the present disclosure provides a method for predicting a face beauty grade, which includes the following steps of:

acquiring a beautiful face image of a face beauty database, preprocessing the beautiful face image, and extracting a beauty feature vector of the beautiful face image;

classifying the beauty feature vector by using a bionic pattern recognition model to obtain a face beauty grade prediction model trained; and collecting a face image to be recognized, inputting the face image to be recognized into the face beauty grade prediction model to predict a face beauty grade and obtain the beauty grade of the face image to be recognized.

Further, the acquiring the beautiful face image of the face beauty database, preprocessing the beautiful face image, and extracting the beauty feature vector of the beautiful face image includes the following steps of:

collecting the beautiful face image of the face beauty database, and extracting a beautiful face key point of the beautiful face image by using a neural network;

preprocessing the beautiful face image according to the beautiful face key point to obtain a normalized standard beautiful face image; and processing the standard beautiful face image by using a width learning network, and extracting a beauty feature vector of the standard beautiful face image.

Further, the preprocessing the beautiful face image according to the beautiful face key point to obtain the normalized standard beautiful face image includes the following steps of:

performing regression prediction on the beautiful face key point to obtain a beautiful face prediction key point;

performing face horizontal-alignment processing on the beautiful face image according to the beautiful face prediction key point to obtain a horizontal beautiful face image; and normalizing the horizontal beautiful face image to obtain the standard beautiful face image.

Further, the processing the standard beautiful face image by using the width learning network, and extracting the beauty feature vector of the standard beautiful face image includes the following steps of:

inputting the standard beautiful face image into the width learning network, and extracting a beauty feature node of the standard beautiful face image;

calculating a beauty enhancement node mapped by the beauty feature node by using a nonlinear activation function;

connecting the beauty feature node and the beauty enhancement node by using an unknown weight parameter to obtain a calculation formula of the beauty feature vector;

inputting a given beauty feature vector into the calculation formula of the beauty feature vector, and performing pseudo-inverse and ridge regression algorithm processing on the calculation formula of the beauty feature vector to obtain the weight parameter; and connecting the beauty feature node and the beauty enhancement node by using the weight parameter to obtain the beauty feature vector.

Further, the bionic pattern recognition model includes a hyper sausage neuron model.

Further, the classifying the beauty feature vector by using the bionic pattern recognition model to obtain the face beauty grade prediction model trained includes the following step of:

inputting the beauty feature vector into the hyper sausage neuron model for processing, dividing the beauty feature vector into a plurality of hyper sausage neurons with different beauty grades, and forming hyper sausage chains with different beauty grades by the plurality of hyper sausage neurons with different beauty grades to obtain the face beauty grade prediction model trained.

Further, the collecting the face image to be recognized, inputting the face image to be recognized into the face beauty grade prediction model to predict the face beauty grade and obtain the beauty grade of the face image recognized includes the following steps of:

collecting the face image to be recognized, and extracting a key point of a face to be recognized of the face image to be recognized by using the neural network;

preprocessing the face image to be recognized according to the key point of the face to be recognized to obtain a normalized standard face image to be recognized;

extracting a feature node to be recognized and an enhancement node to be recognized of the standard face image to be recognized by using the width learning network, and connecting the feature node to be recognized and the enhancement node to be recognized by using the weight parameter to obtain a feature vector to be recognized; and extracting a minimum value of a distance from the feature vector to be recognized to the hyper sausage chains with different beauty grades, if the minimum value of the distance is less than a threshold, then the feature vector to be recognized belonging to the beauty grade of the hyper sausage chain, and the beauty grade of the face image to be recognized being obtained.

According to a second aspect, an embodiment of the present disclosure further provides an apparatus for predicting a face beauty grade, which includes at least one processor and a memory used for communicating with the at least one processor, wherein the memory stores an instruction executable by the at least one processor, and the instruction is executed by the at least one processor to enable the at least one processor to execute the method for predicting a face beauty grade according to any one of the contents above.

According to a third aspect, an embodiment of the present disclosure further provides a computer-readable storage medium, wherein the computer-readable storage medium stores a computer-executable instruction, and the computer-executable instruction is configured to make a computer execute the method for predicting a face beauty grade according to any one of the contents above.

The technical solutions provided in the embodiments of the present disclosure at least have the following beneficial effects: preprocessing the beautiful face image is beneficial to data processing of the beautiful face image and improvement of the detection accuracy; the continuous features of the samples of the same type in the feature space are recognized by using the bionic pattern recognition model, and the beauty feature vector is classified to obtain the face beauty grade prediction model; and the face image to be recognized is input into the face beauty grade prediction model to predict the face beauty grade and obtain the beauty grade of the face image to be recognized. The present disclosure is less influenced by external factors and has higher detection accuracy.

BRIEF DESCRIPTION OF THE DRAWINGS

The disclosure is further described below in embodiments with reference to the drawings, in which

FIG. 4 is a schematic diagram of one embodiment of processing a standard beautiful face image by using a width learning network and extracting a beauty feature vector of the beautiful face image according to the present disclosure;

FIG. 5 is a schematic diagram of one embodiment of classifying the beauty feature vector by using a bionic pattern recognition model according to the present disclosure; and FIGS. 6(a) to 6(c) are schematic diagrams of one embodiment of preprocessing a beautiful face image according to a beautiful face key point.

DETAILED DESCRIPTION

In the present disclosure, a method is provided for predicting a face beauty grade, which can detect a face beauty image in an image and predict the face beauty grade. The method is more simple in network structure, less influenced by external factors and higher accurate in detection.

The embodiments of the present disclosure are further described below with reference to the drawings.

Figure 1:
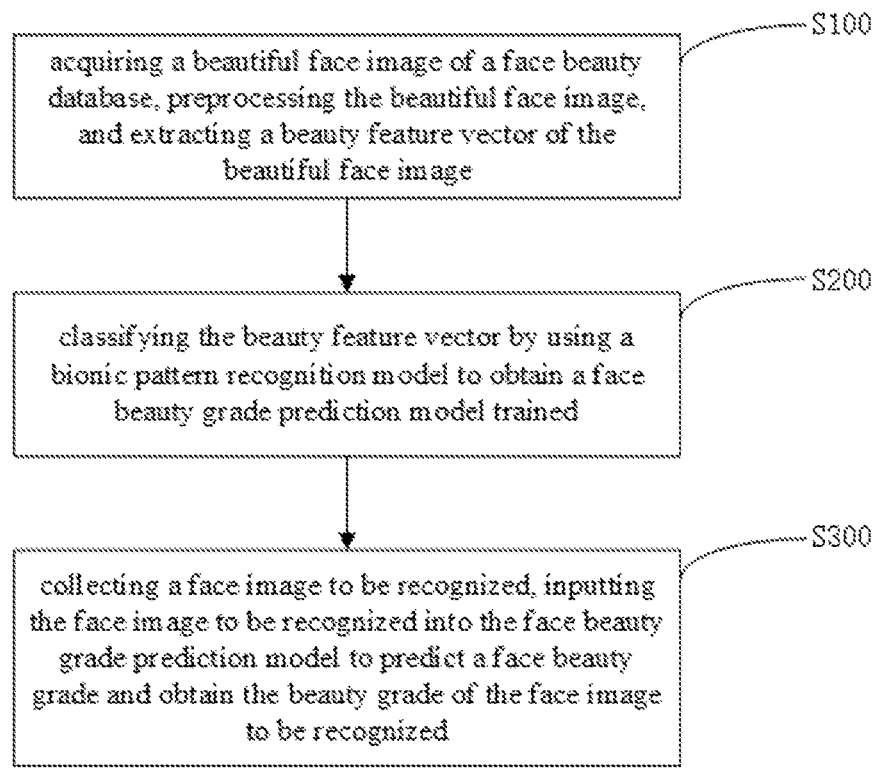
FIG. 1 is an overall flow chart of one embodiment of a method for predicting a face beauty grade according to the present disclosure.

With reference to FIG. 1, one embodiment of the present disclosure provides a method for predicting a face beauty grade, which includes the following steps of:

step S100: acquiring a beautiful face image of a face beauty database, preprocessing the beautiful face image, and extracting a beauty feature vector of the beautiful face image;

step S200: classifying the beauty feature vector by using a bionic pattern recognition model to obtain a face beauty grade prediction model trained; and step S300: collecting a face image to be recognized, inputting the face image to be recognized into the face beauty grade prediction model to predict a face beauty grade and obtain the beauty grade of the face image to be recognized.

In the embodiment, acquiring the beautiful face image of the face beauty database and preprocessing the beautiful face image in the step S100 are beneficial to process data of the beautiful face image in subsequent steps, reduce the difference of the beautiful face image caused by external factors, and improve the detection accuracy. The beautiful face image in the face beauty database has a beauty grade label, such as a first grade, a second grade, a third grade, etc., the beauty degree of each grade is gradually decreased, and each grade represents different beauty degrees. Preferably, the face beauty database can be a SCUT-FBP database, which is a reference database specially used for face beauty evaluation and collects 500 high-resolution face images with different beauty attraction, and the beautiful face images in the SCUT-FBP database are divided into different beauty grades according to the beauty degree.

A mathematical method of the bionic pattern recognition model in the step S200 lies in studying a topological property of a sample set in a feature space, which is also called "topological pattern recognition", a theoretical basis of the "topological pattern recognition" lies in confirming a continuity of the samples of the same type in the feature space. Therefore, the bionic pattern recognition model is used to recognize the feature of the beauty feature vector, and the beauty feature vector is classified to obtain the face beauty grade prediction model trained. The inputting the face image to be recognized into the face beauty grade prediction model to predict the face beauty grade and obtain the beauty grade of the face image to be recognized in step S300 is less influenced by external factors and has higher detection accuracy.

Figure 2:
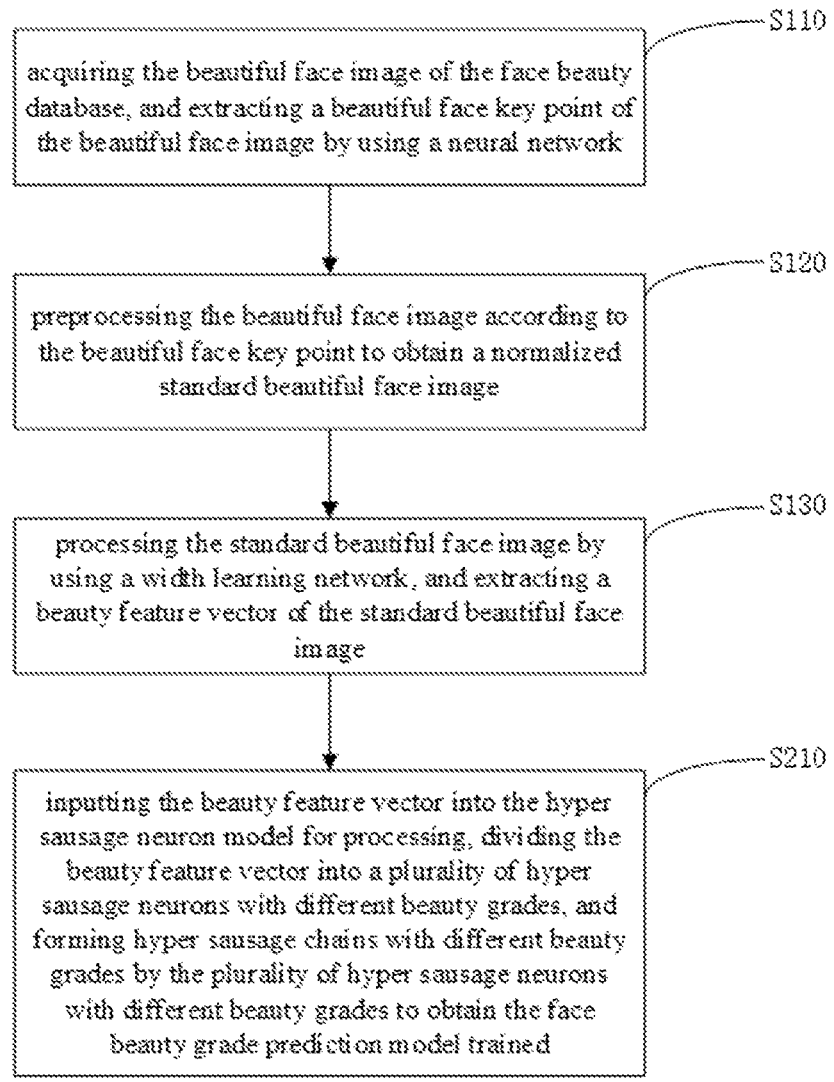
FIG. 2 is a flow chart of one embodiment of a face beauty grade prediction model trained by using a beautiful face image according to the present disclosure.

Further, with reference to FIG. 2, in another embodiment of the present disclosure, a method is further provided for predicting a face beauty grade, wherein the acquiring the beautiful face image of the face beauty database, preprocessing the beautiful face image, and extracting the beauty feature vector of the beautiful face image includes the following steps of:

step S110: acquiring the beautiful face image of the face beauty database, and extracting a beautiful face key point of the beautiful face image by using a neural network;

step S120: preprocessing the beautiful face image according to the beautiful face key point to obtain a normalized standard beautiful face image; and step S130: processing the standard beautiful face image by using a width learning network, and extracting a beauty feature vector of the standard beautiful face image.

In the embodiment, the beautiful face key point of the beautiful face image is extracted by using the neural network in the step S110. The neural network can be a three-level convolutional neural network with a simple structure and a fast extraction speed. The beautiful face key point can be selected from a total of five face key points, including left and right eyes, nose and two ends of corners of mouth, and these five beautiful face key points can well represent features of a human face and highlight the difference of the face of each person. The step of preprocessing the beautiful face image according to the beautiful face key point to normalize the beautiful face image in the step S120 facilitates the processing of the beautiful face image in subsequent steps, reduces the difference of the beautiful face image caused by external factors, and improves the detection accuracy. The width learning network in the step S130 is a random vector function linked neural network, the network structure of which has no coupling and connection between layers, and does not need to update a weight by gradient descent. Therefore, the width learning network has a faster operation speed, and meanwhile, under the condition of ensuring the operation speed, the accuracy can be improved by increasing a width of the network. The width learning network is used to process the standard beautiful face image, with a fast operation speed and a high accuracy.

Further, with reference to FIGS. 6(a) to 6(c), in another embodiment of the present disclosure, a method is further provided for predicting a face beauty grade, wherein the step of preprocessing the beautiful face image according to the beautiful face key point to obtain the normalized standard beautiful face image includes the following steps of:

step S121: performing regression prediction on the beautiful face key point to obtain a beautiful face prediction key point;

step S122: performing face horizontal-alignment processing on the beautiful face image according to the beautiful face prediction key point to obtain a horizontal beautiful face image; and step S123: normalizing the horizontal beautiful face image to obtain the standard beautiful face image.

In the embodiment, the regression prediction in the step S121 is a process of using a correlation principle of prediction as a basis to find out factors affecting a prediction target, then find out an approximate expression of a functional relationship between these factors and the prediction target, estimate model parameters by using sample data, and perform prediction. For the beautiful face key point, a following multi-level regression prediction formula is established to calculate the beautiful face prediction key point:

$$x = \frac{x_1^{(1)} + \ldots + x_{l_1}^{(1)}}{l_1} + \sum_{i=2}^{n} \frac{\Delta x_1^{(i)} + \ldots + \Delta x_{l_i}^{(i)}}{l_i};$$

wherein the multi-level regression prediction formula is a cascade of an $n^{th}$ level, x is the beautiful face prediction key point, and $x_1$ is a value of the beautiful face key point; a first-level prediction is an absolute value prediction position, i.e., the beautiful face key point, the following prediction is adjustment, for example, in a cascade of an $i^{th}$ level, $x_1$ has $l_i$ predicted values, and the adjustment of the predicted value realizes the prediction of the beautiful face key point, and improves a data accuracy.

With reference to FIGS. 6(a) and 6(b), face horizontal-alignment operation is performed according to the beautiful face prediction key point in the step S122 due to the problems of deflection and tilt of the face in the beautiful face image, for example, beautiful face prediction key points of left and right eyes are used, an included angle between a connecting line of the left and right eyes and a horizontal plane is calculated, and the beautiful face image is rotated according to a value of the included angle, so that the face are horizontally aligned to overcome data difference caused by posture deflection.

With reference to FIGS. 6(b) and 6(c), in the step S123, a center point of the left and right eyes and a center point of the mouth in a horizontal beautiful face image are both set as 48 pixels to calculate a scaling of the horizontal beautiful face image, and perform clipping and gray scale transformation on the horizontal beautiful face image, so that the horizontal beautiful face image has a unified size and gray scale, thus completing the normalization processing. The normalized standard beautiful face image contains the beautiful face prediction key point. The normalization processing reduces the difference of the standard beautiful face image caused by external factors and improves the detection accuracy. Other values can be selected for the pixels of the center point of the left and right eyes and the center point of the mouth according to actual situations; and the normalized standard beautiful face image can be set as 144×144.

Further, with reference to FIG. 4, in another embodiment of the present disclosure, a method is further provided for predicting a face beauty grade, wherein the processing the standard beautiful face image by using the width learning network, and extracting the beauty feature vector of the standard beautiful face image includes the following steps of:

step S131: inputting the standard beautiful face image into the width learning network, and extracting a beauty feature node of the standard beautiful face image;

step S132: calculating a beauty enhancement node mapped by the beauty feature node by using a nonlinear activation function;

step S133: connecting the beauty feature node and the beauty enhancement node by using an unknown weight parameter to obtain a calculation formula of the beauty feature vector;

step S134: inputting a given beauty feature vector into the calculation formula of the beauty feature vector, and performing pseudo-inverse and ridge regression algorithm processing on the calculation formula of the beauty feature vector to obtain the weight parameter; and step S135: connecting the beauty feature node and the beauty enhancement node by using the weight parameter to obtain the beauty feature vector.

In the embodiment, the standard beautiful face image is input into the width learning network in the step S131, and an $i^{th}$ beauty feature node mapped by data of the standard beautiful face image is calculated by a following function:

$$Z_i = \phi(XW_{ei} + \beta_{ei}),$$

wherein i=1, 2, . . . , n; $W_{ei}$ is a weight coefficient, $\beta_{ei}$ is a bias item, and both $W_{ei}$ and $\beta_{ei}$ are generated randomly; X is the data of the standard beautiful face image, and $X \in R$; and $\phi(\bullet)$ is an optional nonlinear activation function. $Z_i$ is a beauty feature node, n beauty feature nodes can be generated for the data of the standard beautiful face image input into the width learning network, and the n beauty feature nodes can be represented as $$Z^n = [Z_1, \ldots, Z_n].$$

The beauty enhancement nodes mapped by the n beauty feature nodes are calculated by the following function for the n beauty feature nodes in the step S132, wherein an $m^{th}$ beauty enhancement node is:

$$H_m = \xi(Z^n W_{hm} + \beta_{hm}),$$

wherein m=1, 2, . . . , p; $W_{hm}$ is a weight coefficient, $\beta_{hm}$ is a bias item, and both $W_{hm}$ and $\beta_{hm}$ are generated randomly; and $\xi(\bullet)$ is an optional nonlinear activation function. P beauty enhancement nodes can be mapped and generated for n beauty feature nodes, and the p beauty enhancement nodes can be represented as $$H^p = [H_1, \ldots, H_p].$$

The beauty feature node and the beauty enhancement node are connected by using the unknown weight parameter to obtain the calculation formula of the beauty feature vector in the step S133:

$$Y = [Z_1, \ldots, Z_n | \xi(Z^n W_{h1} + \beta_{h1}), \ldots, \xi(Z^n W_{hm} + \beta_{hm})]W^m$$
$$= [Z_1, \ldots, Z_n | H_1, \ldots, H_m]W^m$$
$$= [Z^n | H^m]W^m,$$

wherein Y is a beauty feature vector and $W^m$ is an unknown weight parameter.

In the step S134, the beauty feature vector is a given output value of a training set in a model training process, i.e., an expected output value; the given beauty feature vector is input into the calculation formula of the beauty feature vector, and pseudo-inverse and ridge regression algorithm processing is performed on the calculation formula:

$$W^m = (\lambda I + AA^T)^{-1} A^T Y,$$
$$A^+ = \lim(\lambda I + AA^T)^{-1} A^T,$$
$$A^+ = [Z^n | H^m]^+,$$

wherein $\lambda$ is a regularization parameter; A is column splicing of the beauty feature node and the beauty enhancement node; and $W^m = [Z^n | H^m]^+ Y$ can be obtained according to the formula above, i.e., a value of the weight parameter is obtained.

The beauty feature node and the beauty enhancement node are connected by using the weight parameter to obtain the actual beauty feature vector in the step S135.

Further, in another embodiment of the present disclosure, a method is further provided for predicting a face beauty grade, wherein the bionic pattern recognition model includes a hyper sausage neuron model.

In the embodiment, the hyper sausage neuron model is a topological product of a one-dimensional manifold and an n-dimensional hypersphere, and is mainly composed of three parts:

$$Q_1: |\vec{Y} - \vec{A}|^2 - \left[(\vec{Y} - \vec{A}) \cdot \frac{\vec{B} - \vec{A}}{|\vec{B} - \vec{A}|}\right]^2 = r,$$

$$Q_2: |\vec{Y} - \vec{A}|^2 = r,$$

$$Q_3: |\vec{Y} - \vec{B}|^2 = r,$$

wherein r is a radius of the neuron model, and $Q_1$ is a set of points that a distance of a line segment AB is the radius; $Q_2$ is a set of points that a distance to a point A is the radius r; and $Q_3$ is a set of points that a distance to a point B is the radius r. A form covered by hyper sausage neuron is a union set of the three parts:

$$Q = \bigcup_{i=1}^{3} Q_i;$$

since an image shape of the union set looks like a sausage, the union set is called the hyper sausage neuron; and moreover, data in the union set of the hyper sausage neurons has similarity, so that the hyper sausage neuron model can extract data with similar properties, wherein the extraction process is simple and the extraction effect is better.

Further, with reference to FIGS. 2 and 5, in another embodiment of the present disclosure, a method is further provided for predicting a face beauty grade, wherein the classifying the beauty feature vector by using the bionic pattern recognition model to obtain the face beauty grade prediction model trained includes the following step of:

step S210: inputting the beauty feature vector into the hyper sausage neuron model for processing, dividing the beauty feature vector into a plurality of hyper sausage neurons with different beauty grades, and forming hyper sausage chains with different beauty grades by the plurality of hyper sausage neurons with different beauty grades to obtain the face beauty grade prediction model trained.

In the embodiment, the beauty feature vector is input into the hyper sausage neuron model in the step S210. Since the beauty feature vector has a beauty grade label, the hyper sausage neuron model divides the beauty feature vector into different beauty grades according to the beauty grade label. For the beauty feature vector $Y = \{Y_1, Y_2, \ldots, Y_N\}$ of the same beauty grade, N is a total number of sample points of the same beauty grade, each sample point contains M feature values, $y_i = \{y_{i1}, y_{i2}, \ldots, y_{iM}\}$, i=1, 2, . . . , N, and an Euclidean distance among all the sample points of the same type is calculated:

$$d = \sqrt{\sum_{i=1}^{N} (y_{1i} - y_{2i})^2},$$

two sample points with the smallest Euclidean distance are found out according to a value of the Euclidean distance and recorded as $A_{11}$ and $A_{12}$, then the two points $A_{11}$ and $A_{12}$ form a first one-dimensional line segment $A_{11}A_{12}$, and the line segment is covered by one hyper sausage neuron, with a covering scope of $P_1$. For the sample points outside the covering scope $P_1$, a point closest to $A_{12}$ is found according to the step above and recorded as $A_{13}$, so as to form a line segment $A_{12}A_{13}$, and then the line segment is covered by one hyper sausage neuron, with a covering scope of $P_2$. In the remaining sample points, sample points included in the covering scope of j−1 former hyper sausage neurons in total are eliminated, and then a point closest to $A_{1(j-1)}$ is found from the sample points outside the covering scope and recorded as $A_{1j}$, so as to form a $j^{th}$ line segment, with a hyper sausage neuron covering scope of $P_j$. The covering of the hyper sausage neurons above is continued until all the sample points of the same beauty grade are covered. Assuming that k hyper sausage neurons are generated, the k hyper sausage neurons are connected into a hyper sausage chain, and a covering area of the hyper sausage chain to the samples of the beauty grade is:

$$P = \bigcup_{i=1}^{k} P_i.$$

According to the steps above, the beauty feature vectors with different beauty grades are respectively covered by the hyper sausage neurons to form hyper sausage chains with different beauty grades and obtain the face beauty grade prediction model trained, wherein the grade division operation is simple and the accuracy is high.

Figure 3:
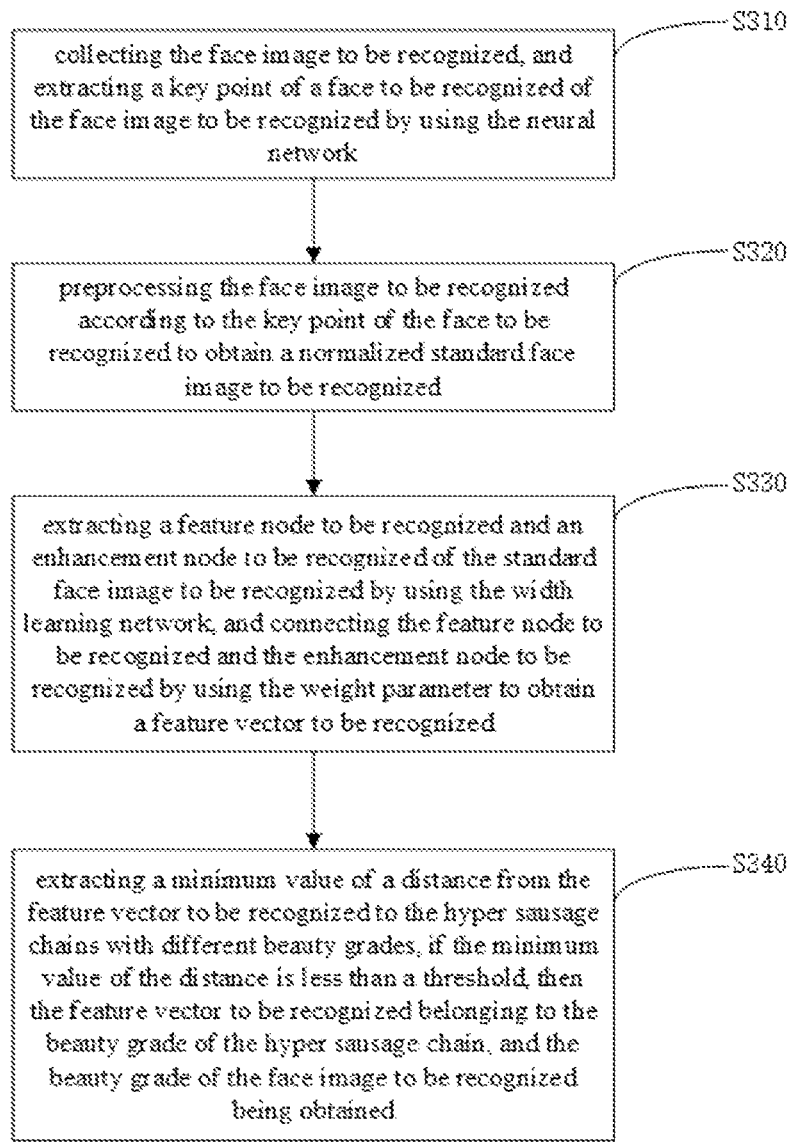
FIG. 3 is a flow chart of one embodiment of predicting a beauty grade of a face image to be recognized by using the face beauty grade prediction model according to the present disclosure.

Further, with reference to FIG. 3, in another embodiment of the present disclosure, a method is provided for predicting a face beauty grade, wherein the collecting the face image to be recognized, inputting the face image to be recognized into the face beauty grade prediction model to predict the face beauty grade and obtain the beauty grade of the face image recognized includes the following steps of:

step S310: collecting the face image to be recognized, and extracting a key point of a face to be recognized of the face image to be recognized by using the neural network;

step S320: preprocessing the face image to be recognized according to the key point of the face to be recognized to obtain a normalized standard face image to be recognized;

step S330: extracting a feature node to be recognized and an enhancement node to be recognized of the standard face image to be recognized by using the width learning network, and connecting the feature node to be recognized and the enhancement node to be recognized by using the weight parameter to obtain a feature vector to be recognized; and step S340: extracting a minimum value of a distance from the feature vector to be recognized to the hyper sausage chains with different beauty grades, if the minimum value of the distance is less than a threshold, then the feature vector to be recognized belonging to the beauty grade of the hyper sausage chain, and the beauty grade of the face image to be recognized being obtained.

In the embodiment, the process of the step S310 is similar to that of the step S110, the process of the step S320 is similar to that of the step S120, and the process of the step S330 is similar to that of the combination of the step S131, the step S132 and the step S135.

The connecting the feature node to be recognized and the enhancement node to be recognized by using the weight parameter to obtain the feature vector to be recognized by calculation in the step S330 has a simple and fast operation process; and the weight parameter is obtained by the calculation formula of the beauty feature vector. In the step S340, the distances from the feature vector to be recognized to the hyper sausage chains with different beauty grades are respectively calculated, and the minimum value of the distances is extracted. If the minimum value of the distances is less than a threshold, the beauty grade of the feature vector to be recognized belongs to the beauty grade of the hyper sausage chain, i.e., the face image to be recognized belongs to the beauty grade of the hyper sausage chain. If the minimum value of the distance is no less than the threshold, the feature vector to be recognized does not belong to any beauty grade. The threshold can be set according to actual situations to adapt to the difference of different face beauty databases, so that the recognition rate of the face beauty grade is at a higher level.

In addition, with reference to FIGS. 1 to 6, in another embodiment of the present disclosure a method is provided for predicting a face beauty grade, which includes the following steps of:

step S110: acquiring the beautiful face image of the face beauty database, and extracting a beautiful face key point of the beautiful face image by using a neural network;

step S121: performing regression prediction on the beautiful face key point to obtain a beautiful face prediction key point;

step S122: performing face horizontal-alignment processing on the beautiful face image according to the beautiful face prediction key point to obtain a horizontal beautiful face image;

step S123: normalizing the horizontal beautiful face image to obtain the standard beautiful face image;

step S131: inputting the standard beautiful face image into the width learning network, and extracting a beauty feature node of the standard beautiful face image;

step S132: calculating a beauty enhancement node mapped by the beauty feature node by using a nonlinear activation function;

step S133: connecting the beauty feature node and the beauty enhancement node by using an unknown weight parameter to obtain a calculation formula of the beauty feature vector;

step S134: inputting a given beauty feature vector into the calculation formula of the beauty feature vector, and performing pseudo-inverse and ridge regression algorithm processing on the calculation formula of the beauty feature vector to obtain the weight parameter;

step S135: connecting the beauty feature node and the beauty enhancement node by using the weight parameter to obtain the beauty feature vector;

step S210: inputting the beauty feature vector into the hyper sausage neuron model for processing, dividing the beauty feature vector into a plurality of hyper sausage neurons with different beauty grades, and forming hyper sausage chains with different beauty grades by the plurality of hyper sausage neurons with different beauty grades to obtain the face beauty grade prediction model trained;

step S310: collecting the face image to be recognized, and extracting a key point of a face to be recognized of the face image to be recognized by using the neural network;

step S320: preprocessing the face image to be recognized according to the key point of the face to be recognized to obtain a normalized standard face image to be recognized;

step S330: extracting a feature node to be recognized and an enhancement node to be recognized of the standard face image to be recognized by using the width learning network, and connecting the feature node to be recognized and the enhancement node to be recognized by using the weight parameter to obtain a feature vector to be recognized; and step S340: extracting a minimum value of a distance from the feature vector to be recognized to the hyper sausage chains with different beauty grades, if the minimum value of the distance is less than a threshold, then the feature vector to be recognized belonging to the beauty grade of the hyper sausage chain, and the beauty grade of the face image to be recognized being obtained.

In the embodiment, regression prediction, horizontal alignment, normalization and other processing performed on the beautiful face image are beneficial to the unification of data and improve the detection accuracy; using the width learning network to process the standard beautiful face image to obtain the weight parameter is beneficial to the calculation of the feature vector to be recognized, which has a fast operation speed and a high accuracy; the hyper sausage neuron model is used to recognize the continuous features of the samples of the same type in the feature space, and classify the beauty feature vector to obtain the face beauty grade prediction model; and the face image to be recognized is input into the face beauty grade prediction model for face beauty grade prediction to obtain the beauty grade of the face image to be recognized, which has a fast prediction speed, is less influenced by external factors, and has higher detection accuracy.

Moreover, in another embodiment of the present disclosure, an apparatus is further provided for predicting a face beauty grade, including at least one processor and a memory used for communicating with the at least one processor, wherein the memory stores an instruction executable by the at least one processor, and the instruction is executed by the at least one processor to enable the at least one processor to execute any one of the method for predicting a face beauty grade as described above.

In the embodiment, the apparatus for predicting a face beauty grade includes one or more processor and a memory, wherein the processor and the memory may be connected by a bus or other methods.

As a non-transitory computer-readable storage medium, the memory can be used to store non-transitory software programs, non-transitory computer executable programs, and modules, such as program instructions/modules corresponding to the method for predicting a face beauty grade in the embodiments of the present disclosure. The processor runs the non-transitory software programs, instructions, and modules stored in the memory, thus performing functional applications and data processing of the apparatus for predicting a face beauty grade, that is, implementing the method for predicting a face beauty grade of the above method embodiments.

The memory may include a program storage region and a data storage region, wherein the program storage region may store application programs required by an operating system and at least one function; and the data storage region can store data and the like created according to the use of the apparatus for predicting a face beauty grade. In addition, the memory may include a high-speed random access memory, and may also include a non-transitory memory, such as at least one disk memory device, a flash memory device, or other non-transitory solid storage devices. In some embodiments, the memory optionally includes a memory remotely disposed with respect to the processor, which may be connected to the apparatus for predicting a face beauty grade through a network. Examples of the above networks include, but are not limited to, the Internet, enterprise intranets, local area networks, mobile communication networks, and combinations thereof.

The one or more modules are stored in the memory, and when being executed by the one or more processors, executes the method for predicting a face beauty grade in the above method embodiments, for example, executes the steps S100 to S300, S110 to S130, S121 to S123, S131 to S135, S210, and S310 to S340 in the above-described method.

An embodiment of the present disclosure further provides a computer-readable storage medium, wherein the computer-readable storage medium stores a computer-executable instruction, and the computer-executable instruction is executed by one or more processors, for example, executed by one processor, so that the one or more processors above can execute the method for predicting a face beauty grade in the method embodiments above, for example, execute the steps S100 to S300, S110 to S130, S121 to S123, S131 to S135, S210, and S310 to S340 in the above-described method.

The apparatus embodiments described above are only exemplary, wherein the units described as separated parts may or may not be physically separated, that is, may be located in one place, or may be distributed on multiple network units. Some or all of the modules may be selected according to actual needs to achieve the objectives of the solutions in the embodiments.

From the above description of the embodiments, those skilled in the art can clearly understand that the embodiments can be implemented by means of software and a general hardware platform. Those skilled in the art should understand that all or a part of the flow of the methods in the above embodiments may be implemented by instructing relevant hardware through a computer program. The program may be stored in a computer-readable storage medium, and when being executed, may include the flow of the above-mentioned method embodiments. The storage medium may be a magnetic disk, an optical disk, a Read Only Memory (ROM) or a Random Access Memory (RAM), etc.

The above only describes the preferred embodiments of the present disclosure. Thus, any equivalent variations or modifications made according to the structure, features and principles described in the scope of the disclosure are all fell into the scope limited by the claims appended hereto.

What is claimed is:

1. A method for predicting a face beauty grade, comprising following steps of:
    acquiring a beautiful face image from a face beauty database, preprocessing the beautiful face image, and extracting a beauty feature vector of the beautiful face image;
    classifying the beauty feature vector by using a bionic pattern recognition model to obtain a face beauty grade prediction model trained; and
    collecting a face image to be recognized, inputting the face image to be recognized into the face beauty grade prediction model to predict a face beauty grade and obtain the face beauty grade of the face image to be recognized;
    wherein the bionic pattern recognition model comprises a hyper sausage neuron model, and
    wherein the classifying the beauty feature vector by using the bionic pattern recognition model to obtain the face beauty grade prediction model trained further comprises a step of
        inputting the beauty feature vector into the hyper sausage neuron model for processing, dividing the beauty feature vector into a plurality of hyper sausage neurons with different beauty grades, and forming hyper sausage chains with different beauty grades by the plurality of hyper sausage neurons with different beauty grades to obtain the face beauty grade prediction model trained.

2. The method of claim 1, wherein the acquiring the beautiful face image of the face beauty database, preprocessing the beautiful face image, and extracting the beauty feature vector of the beautiful face image further comprises steps of:
acquiring the beautiful face image of the face beauty database, and extracting a beautiful face key point of the beautiful face image by using a neural network;
preprocessing the beautiful face image according to the beautiful face key point to obtain a normalized standard beautiful face image; and
processing the normalized standard beautiful face image by using a width learning network, and extracting a beauty feature vector of the normalized standard beautiful face image.

3. The method of claim 2, wherein the preprocessing the beautiful face image according to the beautiful face key point to obtain the normalized standard beautiful face image further comprises steps of:
performing regression prediction on the beautiful face key point to obtain a beautiful face prediction key point;
performing face horizontal-alignment processing on the beautiful face image according to the beautiful face prediction key point to obtain a horizontal beautiful face image; and
normalizing the horizontal beautiful face image to obtain the normalized standard beautiful face image.

4. The method of claim 2, wherein the processing the normalized standard beautiful face image by using the width learning network, and extracting the beauty feature vector of the normalized standard beautiful face image further comprises steps of:
inputting the normalized standard beautiful face image into the width learning network, and extracting a beauty feature node of the normalized standard beautiful face image;
calculating a beauty enhancement node mapped by the beauty feature node by using a nonlinear activation function;
connecting the beauty feature node and the beauty enhancement node by using an unknown weight parameter to obtain a calculation formula of the beauty feature vector;
inputting a given beauty feature vector into the calculation formula of the beauty feature vector, and performing pseudo-inverse and ridge regression algorithm processing on the calculation formula of the beauty feature vector to obtain the unknown weight parameter; and
connecting the beauty feature node and the beauty enhancement node by using the unknown weight parameter to obtain the beauty feature vector.

5. The method of claim 4, wherein the collecting the face image to be recognized, inputting the face image to be recognized into the face beauty grade prediction model to predict the face beauty grade and obtain the face beauty grade of the face image recognized comprises steps of:
collecting the face image to be recognized, and extracting a key point of a face to be recognized of the face image to be recognized by using the neural network;
preprocessing the face image to be recognized according to the key point of the face to be recognized to obtain a normalized standard face image to be recognized;
extracting a feature node to be recognized and an enhancement node to be recognized of the normalized standard face image to be recognized by using the width learning network, and connecting the feature node to be recognized and the enhancement node to be recognized by using the unknown weight parameter to obtain a feature vector to be recognized; and
extracting a minimum value of a distance from the feature vector to be recognized to the hyper sausage chains with different beauty grades, if the minimum value of the distance is less than a threshold, then the feature vector to be recognized belonging to the face beauty grade of the hyper sausage chains, and the face beauty grade of the face image to be recognized being obtained.

6. An apparatus for predicting a face beauty grade, comprising:
at least one processor, and
a memory for communicating with the at least one processor,
wherein the memory stores an instruction executable by the at least one processor, and the instruction is executed by the at least one processor to enable the at least one processor to execute a method for predicting a face beauty grade, the method comprising following steps of
acquiring a beautiful face image from a face beauty database, preprocessing the beautiful face image, and extracting a beauty feature vector of the beautiful face image;
classifying the beauty feature vector by using a bionic pattern recognition model to obtain a face beauty grade prediction model trained; and
collecting a face image to be recognized, inputting the face image to be recognized into the face beauty grade prediction model to predict a face beauty grade and obtain the face beauty grade of the face image to be recognized;
wherein the bionic pattern recognition model comprises a hyper sausage neuron model, and
wherein the classifying the beauty feature vector by using the bionic pattern recognition model to obtain the face beauty grade prediction model trained further comprises a step of
inputting the beauty feature vector into the hyper sausage neuron model for processing, dividing the beauty feature vector into a plurality of hyper sausage neurons with different beauty grades, and forming hyper sausage chains with different beauty grades by the plurality of hyper sausage neurons with different beauty grades to obtain the face beauty grade prediction model trained.

7. The apparatus of claim 6, wherein the acquiring the beautiful face image of the face beauty database, preprocessing the beautiful face image, and extracting the beauty feature vector of the beautiful face image further comprises steps of:
acquiring the beautiful face image of the face beauty database, and extracting a beautiful face key point of the beautiful face image by using a neural network;
preprocessing the beautiful face image according to the beautiful face key point to obtain a normalized standard beautiful face image; and
processing the normalized standard beautiful face image by using a width learning network, and extracting a beauty feature vector of the normalized standard beautiful face image.

8. A non-transitory computer-readable storage medium having stored thereon instructions for causing one or more processer to execute a method a method for predicting a face beauty grade, the method comprising following steps of acquiring a beautiful face image from a face beauty database, preprocessing the beautiful face image, and extracting a beauty feature vector of the beautiful face image; classifying the beauty feature vector by using a bionic pattern recognition model to obtain a face beauty grade prediction model trained; and collecting a face image to be recognized, inputting the face image to be recognized into the face beauty grade prediction model to predict a face beauty grade and obtain the face beauty grade of the face image to be recognized; wherein the bionic pattern recognition model comprises a hyper sausage neuron model, and wherein the classifying the beauty feature vector by using the bionic pattern recognition model to obtain the face beauty grade prediction model trained further comprises a step of inputting the beauty feature vector into the hyper sausage neuron model for processing, dividing the beauty feature vector into a plurality of hyper sausage neurons with different beauty grades, and forming hyper sausage chains with different beauty grades by the plurality of hyper sausage neurons with different beauty grades to obtain the face beauty grade prediction model trained.

9. The non-transitory computer-readable storage medium of claim 8, wherein the acquiring the beautiful face image of the face beauty database, preprocessing the beautiful face image, and extracting the beauty feature vector of the beautiful face image further comprises steps of: acquiring the beautiful face image of the face beauty database, and extracting a beautiful face key point of the beautiful face image by using a neural network; preprocessing the beautiful face image according to the beautiful face key point to obtain a normalized standard beautiful face image; and processing the normalized standard beautiful face image by using a width learning network, and extracting a beauty feature vector of the normalized standard beautiful face image.

* * * * *